United States Patent
Johnnie et al.

(10) Patent No.: US 8,403,389 B1
(45) Date of Patent: Mar. 26, 2013

(54) DEVICE FOR RECOVERY OF PHYSICAL OBJECTS

(75) Inventors: Nathan Johnnie, Middletown, RI (US); Helene B. Anderson, West Greenwich, RI (US); Joseph W. Robicheau, Portsmouth, RI (US); Francis J. O'Brien, Jr., Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/248,456

(22) Filed: Sep. 29, 2011

(51) Int. Cl.
*B66C 1/12* (2006.01)
*B63B 21/50* (2006.01)

(52) U.S. Cl. ........................ 294/66.1; 294/66.2; 367/131

(58) Field of Classification Search .................. 294/66.1, 294/66.2, 82.11, 82.3, 905; 59/78, 78.1, 59/93; 367/131, 137, 140
See application file for complete search history.

(56) References Cited

U.S. PATENT DOCUMENTS

| | | | | |
|---|---|---|---|---|
| 3,848,226 A | * | 11/1974 | Perez | 367/133 |
| 3,858,166 A | * | 12/1974 | Hammond | 367/133 |
| 7,016,260 B2 | * | 3/2006 | Bary | 367/15 |
| 7,036,363 B2 | * | 5/2006 | Yogeswaren | 73/152.16 |
| 2002/0053278 A1 | * | 5/2002 | Hayes et al. | 89/1.34 |
| 2010/0239406 A1 | * | 9/2010 | Nicholls | 294/66.1 |

* cited by examiner

*Primary Examiner* — Paul T Chin
(74) *Attorney, Agent, or Firm* — James M. Kasischke; Michael P. Stanley; Jean-Paul A. Nasser (57) ABSTRACT

A device for recovery of physical objects includes a chain having two ends and a retriever attached to one of the ends. The retriever is configured to locate the object to be recovered and to grasp and retrieve that object once located. The retriever includes transducers that detect acoustic frequencies propagating in a fluid medium. Independent transponders, which can be deployed from the retriever; are provided for deployment in an area to be searched. Each transponder emits a predetermined acoustic frequency that is detectable by the transducers. The transducers signal movement of the recovery device for retrieval of the object.

4 Claims, 5 Drawing Sheets

DEVICE FOR RECOVERY OF PHYSICAL OBJECTS

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF INVENTION

1) Field of the Invention

The present invention is directed to a device for recovering physical objects.

2) Description of Prior Art

Object retrieval presents two significant obstacles; the location of the object and physical access to the object. In order to gain physical access to objects in areas that are not easily accessible (for example, in the deep sea); mechanical and remotely-operated recovery devices are used. These mechanical recovery devices typically utilize a mechanically-operated gripping mechanism mounted on an arm or a boom so that the mechanism can be maneuvered into a position for grasping the object to be retrieved. For example, U.S. Pat. No. 4,015,873 is directed to a U-shaped retrieving device having spring-based fingers attached to a retrieval line.

Regarding the act of locating the object, certain objects (e.g., aircraft black boxes) emit signals that are used locate those objects. Other devices do not emit signals or their signals may not be functioning properly.

In either case, the actual location of an object is accomplished using a process of triangulation. For example, devices such as acoustic beacons have been used to triangulate the location of an object to be retrieved. Transponders are released in known locations and the location of the object is determined using acoustic signals received from the object by each of the transponders.

Mechanisms for locating an object are often separate from and independent of the mechanisms for retrieving those objects; thereby, requiring separate deployment and operation of each mechanism. These actions require coordination that complicates retrieval efforts. In addition, the environments in which the objects to be retrieved are located, present challenges to the operation of the retrieval device. For example, strong ocean currents inhibit accurate maneuvering of retrieval mechanisms by causing these devices to drift or twist. Therefore, recovery devices are desired that can both effectively locate and retrieve objects.

SUMMARY OF THE INVENTION

Exemplary embodiments of a system and method in accordance with the present invention provide a recovery device with integrated object locating mechanisms that can be deployed and operated in remote locations and in challenging conditions.

The recovery device comprises a cable having two ends, a retriever and a transponder. The retriever with at least two transducers is attached to one of the ends of the cable. Each transducer is configured to detect acoustic frequencies propagating in a fluid medium. The transponder, configured to emit an acoustic frequency, is independent of and separate from the cable and retriever.

In preferred embodiments, the acoustic frequency is selected to be detectable by the transducers and is distinguishable from acoustic signals emitted from devices or objects to be recovered by the recovery device. In one embodiment, the recovery device includes a plurality of independent and separate transponders. Each transponder is configured to emit a different predetermined acoustic frequency.

In another embodiment, the recovery device includes a plurality of transducers arranged in an array. In yet another embodiment, each transponder in the plurality of transponders is deployably attached to the retriever portion of the recovery device.

In still another embodiment, the recovery device includes a cable having two ends and a retriever. The retriever has a metal detector, a magnet and a grabbing mechanism. The grabbing mechanism has a plurality of independent fingers movably attached to the retriever.

In still another embodiment, the retriever also includes a plurality of magnets. Each magnet is attached to one of the fingers. In still another embodiment, the retriever includes a touch sensor configured to notify a user when the retriever contacts an object.

In yet another embodiment, the cable is a chain. The chain has a plurality of links arranged as a series of links. The chain also has a plurality of pins. Each pin has two ends defining a length of the pin. Each pin is attached to and extends between adjacent pairs of links in the chain and is configured to secure adjacent pairs of links together. The pins are attached to the adjacent links such that length of each pin extends parallel to the length of the chain.

In still another embodiment, each link in each adjacent pair of links has a surface. The surfaces of the adjacent pairs of links are in contact with each other with the pin extending through these surfaces.

In still another embodiment, each link is formed from a body that defines an open interior, and each surface is contained within the body (for example at an end of each link). Each link includes two surfaces at opposite ends of the link and is contained in two separate adjacent pairs of links. A pin is associated with each adjacent pair of links, extending through one of the surfaces of each link in the pair of adjacent links and extending into the interior of each link.

In still another embodiment, each pin includes a spherical head on each one of its two ends. Each spherical head is disposed in the interior of a given link in an associated adjacent pair of links in which that end of the pin is located. Each link includes a concave area disposed in the interior of the link and formed in the body in an area that is opposite each surface that is on the exterior of the body of the link. The spherical heads of the pins engage these concave areas of the body of each link. This arrangement provides a rotatable, ball-and-socket type engagement between the ends of the pins and the bodies of the links.

In a given adjacent pair of links, one of the links has a first surface that is in contact with the second surface associated with the other link in that adjacent pair of links. These surfaces slide with respect to each other and can rotate relative to each other around an axis defined by the pin passing through both surfaces. This action facilitates relative rotation around this same axis by both links in the adjacent pair of links.

In one embodiment, a rod or other protrusion extends from the first surface in the direction of the second surface and engages the second surface. The second surface contains a void (for example: shaped as a slit or partial circular groove centered on the pin passing through the second surface). The rod passes into and engages the void. The rod and the length of an arc defined by the void are configured so that the rod passes completely through the void; thereby, defining a predetermined degree of rotation between both links in the adjacent pair of links about the pin. This engagement of the rod in the void limits the relative rotational movement between the links in the adjacent pair of links around the axis of the pin.

In one embodiment, this relative rotation between links in a given adjacent pair of links is limited to approximately thirty degrees. Therefore, the void defines a thirty degree arc centered on the pin.

BRIEF DESCRIPTION OF THE DRAWINGS

A more complete understanding of the invention and many of the attendant advantages there to will be readily appreciated as the same becomes better understood by reference to the following detailed description when considered in conjunction with the companying drawings wherein like reference numerals and symbols designate identical or corresponding parts throughout the several views and wherein.

DETAILED DESCRIPTION OF THE INVENTION

Exemplary embodiments of systems and methods in accordance with the present invention are directed to recovery devices that provide for both the location of objects to be recovered and the recovery of these objects. The recovery devices are rugged enough to be operated in a desired environment and can compensate for the operating conditions found in those environments. Suitable environments include underwater environments, surface water environments, mountains, swamps, thickly forested areas and ice and snow covered terrain.

The objects to be recovered include devices that emit homing signals or other signals or frequencies that can be detected and devices that are silent and do not emit any known or detectable signals.

Figure 1:
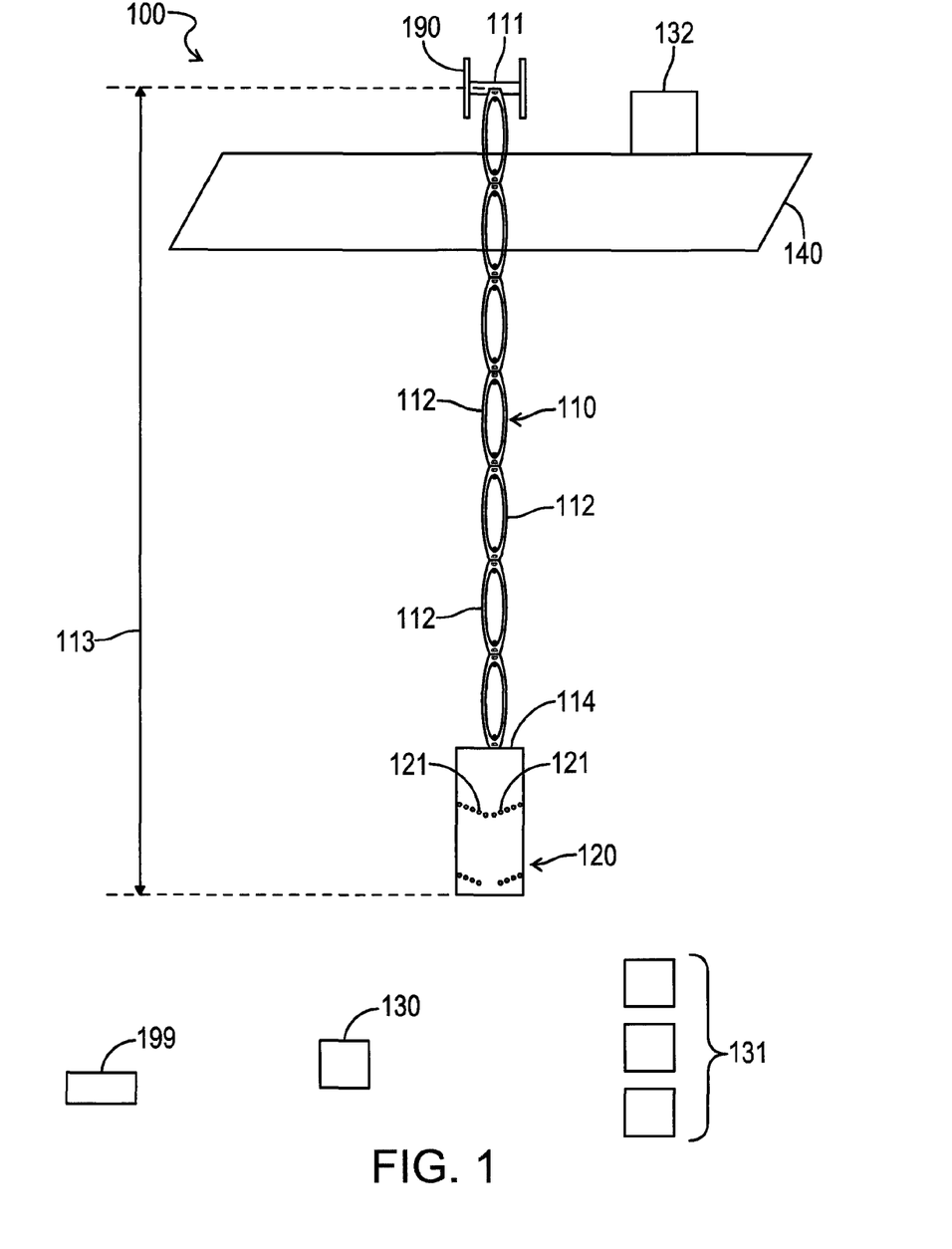
FIG. 1 is a schematic of an embodiment of a recovery device in accordance with the present invention.

Referring initially to FIG. 1, a recovery device 100 in accordance with exemplary embodiments of the present invention is depicted. The recovery device 100 includes a cable 110 having two ends. Suitable cables include, but are not limited to, twisted or braided wire cables, mechanics cables and wire ropes.

In one embodiment, the cable 110 is a chain having a plurality of separate links 112 arranged in series to define a length of the cable or chain. Each link 112 can move or rotate relative to the other links in the chain, and each link, with the exception of the first and last links in the chain is adjacent two other links in the chain and is therefore contained in two separate pairs of adjacent links. Suitable materials for the cable are selected to be compatible with the environment in which the recovery device is deployed.

The recovery device 100 is controllably positioned on a platform 140 attached to a first end 111 of the cable 110. The platform includes a spool 190 mountable to the platform 140 with the first end 111 attached to the spool. The length of the cable 110 can be stored and deployed from the spool 190. The platform 140 can also include motors, boom arms, pulleys and guides to aid in the deployment of the cable 110.

The platform 140 can be a stationary platform or a mobile platform. Suitable mobile platforms include, but are not limited to; vehicles, trucks, helicopters, fixed-wing aircraft, surface vessels and underwater vessels. The platform 140 includes a power source and electronic control necessary to operate, monitor and control the recovery device 100.

The recovery device 100 also includes at least one retriever 120 attached to a second end 114 of the cable 110. The second end 114 is located opposite the first end 111 of the cable 110 along a length 113. The retriever 120 is configured to both locate objects to be retrieved and to grasp or secure those objects. The retriever 120 can be remotely monitored and manipulated.

The recovery device 100 includes a plurality of transducers 121 attached to the retriever 120. In one embodiment, the recovery device 100 includes at least two transducers 121. In another embodiment, the recovery device 100 includes three or more transducers 121. Each transducer 121 is configured to detect acoustic frequencies propagating in a fluid medium in which the recovery device 100 is deployed and the object 199 to be recovered is located. These acoustic frequencies can be emitted from the object 199 (e.g., a black box from an aircraft).

In one embodiment, these acoustic frequencies are also emitted from one or more acoustic transponders 130, 131 that are attached to the retriever 120 or are otherwise deployed into the fluid medium in an area to be searched. The transducers 121 are configured to use both detection of acoustic signals from the object 199 and from the transponders 130, 131 and triangulation to determine a location of the object relative to the retriever 120. In general, a sufficient number of transducers 121 are attached to the retriever 120 and are provided in a desired arrangement as necessary to locate the object 199.

Figure 2:
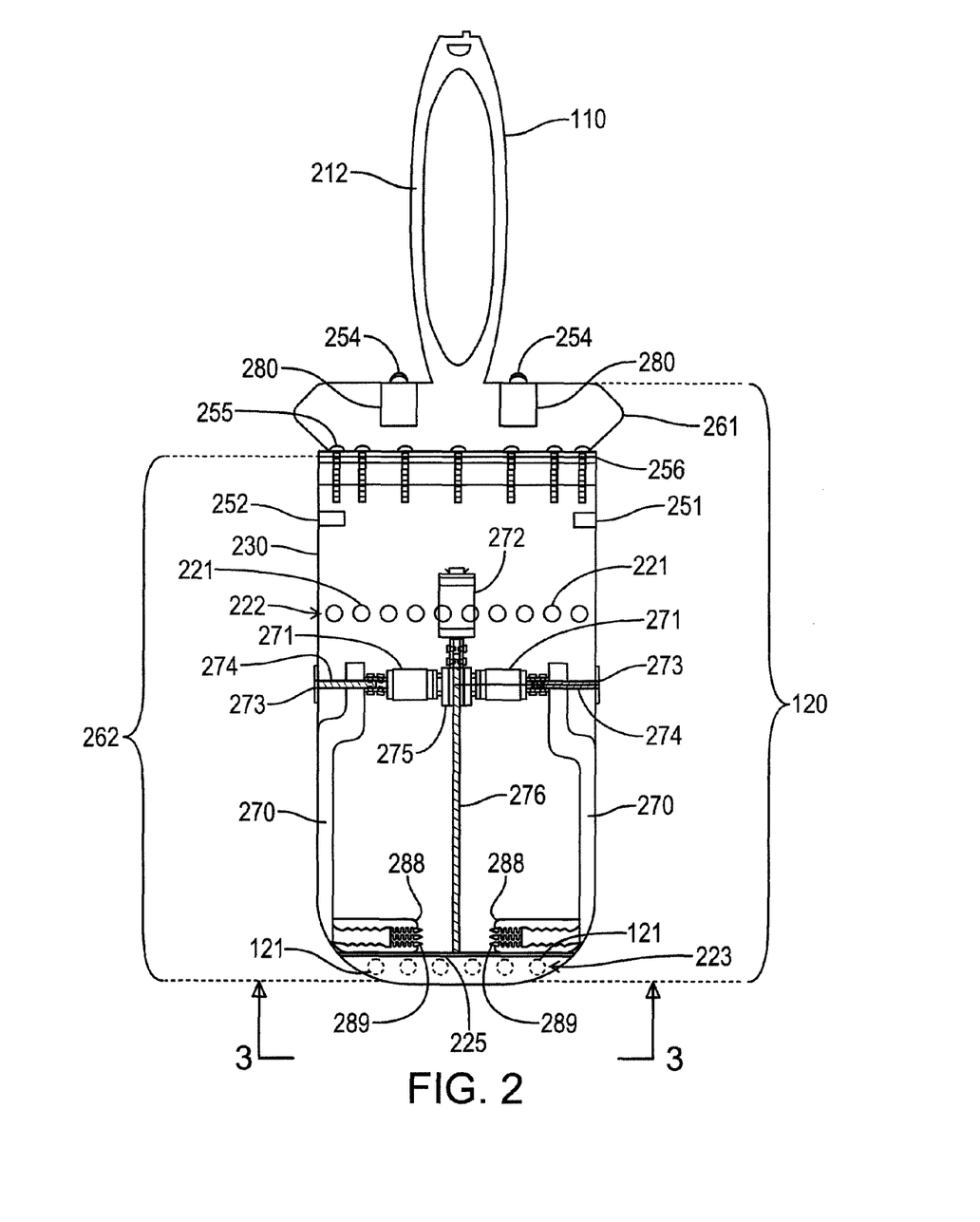
FIG. 2 is a representation of an embodiment of a retriever for use in the recovery device of the present invention.

Referring to FIG. 2, the retriever 120 includes a first section 261 configured to attach the retriever to the cable 110 and a second section 262 attached to the first section. In one embodiment, the cable 110 is a chain, and the first section 261 is attached to and formed integral with a last link 212 at the second end 114 of the chain. Suitable materials for the first section 261 include, but are not limited to, plastics and metals including stainless steel. In one embodiment, the first and second sections 261, 262 are secured together using a plurality of fasteners 255. Suitable fasteners are known and available in the art and include stainless steel socket head screws.

Using threaded fasteners facilitates detachment and removal of the first section 261 from the second section 262. A gasket 256 is provided between the first section 261 and the second section 262. The gasket 256 is formed from any gasket material (e.g., elastomer or rubber) that is sufficient to seal the gap in the retriever 120 between the first and second sections 261, 262 from the environment. Suitable gasket materials are known and available in the art.

In one embodiment, the retriever 120 is generally cylindrical with the first section 261 forming a lid or cover for the second section 262. The first section 261 includes a plurality of threaded holes 280 extending from a surface opposite the second section 262 into the body of the first section 261.

These holes 280 are arranged around the first section 261 to accept ballast weights that provide stability to the retriever 120 in a fluid medium. In one embodiment, a threaded ballast weight 254 is screwed into each hole. A sufficient number of ballast weights 254 are provided in the first section 261 to counter or to dampen drift and movement of the retriever caused by conditions in the ambient environment. In one embodiment, the first section 261 can include at least eight ballast weights 254.

In an embodiment where the first section 261 is cylindrical; the ballast weights 254 are spaced radially around the cylinder at equal intervals. In another embodiment, the ballast weights 254 are uniform in size or the size of the ballast weights can vary to compensate for the weight of the retriever 120 and to act as ballast to level and stabilize the retriever.

The second section 262 includes a generally cylindrical case 230. Contained within the case 230 and exposed to the environment are a temperature sensor 251 and a pressure sensor 252. The temperature sensor 251 can be any type of thermal sensor sufficient to measure the temperature of the environment. Similarly, the pressure sensor 252 can be any type of pressure sensor sufficient to measure the pressure of the environment. Suitable pressure and temperature sensors are known in the art and are commercially-available.

The retriever 120 includes a plurality of transducers 221 disposed in the case 230 and in communication with the environment. The transducers 121 are arranged in two separated groups or arrays spaced from each other along the case 230. These groups include a first array 222 and a second array 223. In one embodiment, the transducers 121 in each array of transducers are spaced equally around the outer circumference of the cylindrical case 230.

The case 230 also contains a grabbing mechanism initially disposed within the case. The grabbing mechanism has a plurality of fingers 270 sufficient to grasp the object to be recovered. The grabbing mechanism can include four fingers 270 arranged equidistantly around the circumference of the case 230 and is moveable with respect to each other to open and close in order to grasp objects.

In one embodiment, each finger 270 includes a semi-soft grabber support 288 on the end of each finger and at least one touch sensor 289 extending from the end of each finger. Preferably, a plurality of touch sensors 289 extend from the end of each finger. The grabber supports 288 provide a soft material to grip the objects to be recovered, and the touch sensors 289 provide feedback to indicate when the fingers 270 are in contact with or are gripping the object 199. The touch sensors 289 can also provide feedback regarding the amount of force used to grip the object 199. Therefore, damage to the object 199 can be prevented.

Each finger 270 can also include at least one magnet (not shown). The magnet can be located along the length of each finger 270 and is used to attract or hold magnetic material to be recovered. The magnet can be an electro-magnet that can be activated as desired. Alternately, the entire length of each finger 270 can be magnetized.

In one embodiment, the retriever 120 includes a plurality of motors disposed within the case and in communication with the fingers 270. The plurality of motors includes at least one vertical motor 272. The vertical motor 272 is in communication with a vertical shaft 276 disposed in the interior of the case 230 and running concentrically along the length of the cylindrical case. The vertical motor 272 is configured to rotate the vertical shaft 276. A central node 275 engages the vertical shaft 276. Rotation of the vertical shaft 276 by the vertical motor 272 moves the central node 275 along the longitudinal axis of the case 230, which is typically the vertical axis when the retriever 120 is deployed.

Also included in the retriever 120 is at least one horizontal shaft 274 attached to and extending from the central node 275. Preferably, the retriever 120 includes a plurality of horizontal shafts, one for each finger 270. Therefore, each horizontal shaft 274 extends from the central node, 275 to one of the fingers 270.

In one embodiment, each horizontal shaft 274 is attached to and engages one of a plurality of horizontal motors 271. Each horizontal motor 271 is configured to rotate one of the horizontal shafts 274. In another embodiment, each horizontal motor 271 is attached to the central node 275, and the horizontal shaft 274 extends from the horizontal motor. A retainer flange 273 is attached to the end of each shaft opposite the horizontal motor 271.

Each finger 270 is engaged with one of the horizontal shafts 274 between the horizontal motor 271 and the retainer flange 273. This engagement can be a threaded engagement. Rotation of the horizontal shaft 274 by the horizontal motor 271 moves the finger 270 along the length of the horizontal shaft 274. The retainer flange 273 prevents the finger 270 from being advanced completely off the horizontal shaft 274.

The vertical motor 272 and vertical shaft 276 advance the fingers 270 downward and out from the case 230. The horizontal motors 271 and shafts 274 move the now exposed fingers 270 away from each other at a sufficient distance to grasp the object 199. The horizontal motors 271 and horizontal shafts 274 are then used to move the fingers toward each other to grasp and recover the object.

Figure 3:
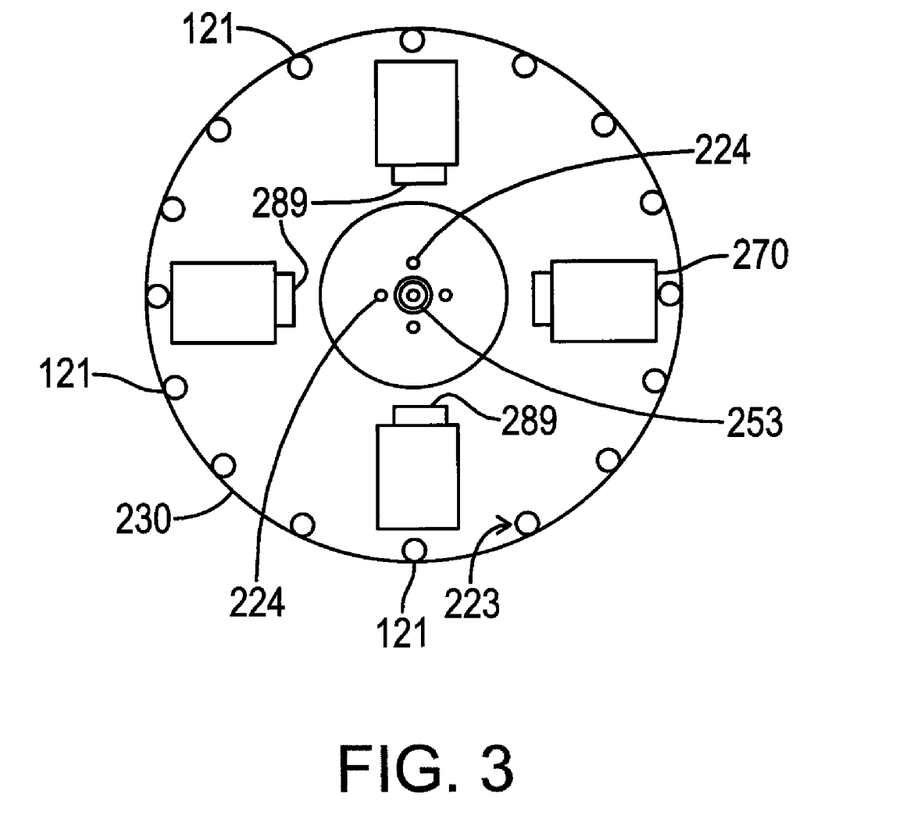
FIG. 3 is a view through section lines 3-3 of FIG. 2.

As is illustrated in FIG. 3, the retriever 120 includes least one additional vertical transducer 224 attached to a plate 225 connected to an end of the vertical shaft 276. Preferably, the retriever 120 includes a plurality of vertical transducers 224 attached to the plate 225. The vertical transducers 224 are arranged in an array around the plate 225 and face vertically downward when the retriever 120 is deployed. In one embodiment, the vertical transducers 224 are arranged in a circular array placed equidistantly apart and around the circumference of the circular plate 225.

In another embodiment, the retriever 120 also includes at least one touch sensor 253 attached to the plate 225. The touch sensor 253 faces vertically downward when the retriever 120 is deployed and provides an indication when the retriever contacts an object, the ground or the bottom of the ocean floor.

Returning to FIG. 2, the first section 261 of the retriever 120 is attached to the cable 110. The cable 110 is constructed of any material sufficient to hold the weight of the retriever 120 and the object to be recovered. The cable 110 is also configured to tolerate the operating conditions of the environment including any additional forces placed on the retriever 120 by the environment (for example, the force of ocean currents).

Figure 4:
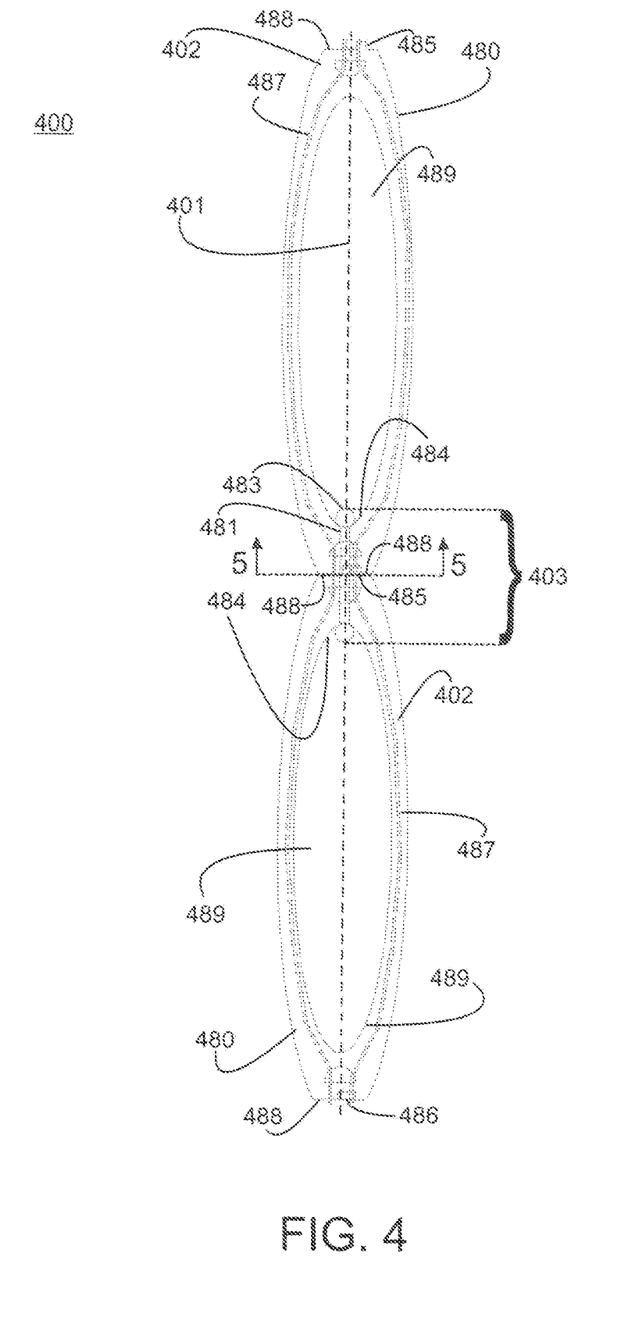
FIG. 4 is an illustration of a portion of an embodiment of a chain for use as the cable in the recovery device of the present invention.

In yet another embodiment, the cable 110 is configured as a chain containing a plurality of independent chain links. As illustrated in FIG. 4, the links are arranged as adjacent pairs of links 400, and each link 480 in an adjacent pair of links is moveable with respect to the other link in the adjacent pair. This movement includes an amount of bending movement relative to axis 401 running along the length of the chain and rotational movement about this axis. Suitable shapes for each link 400 include circular shapes and rectangular shapes.

In one embodiment, each link 400 has an elongated shape formed by a body 402 that defines an open interior 489. Although the body 402 can completely encase the open interior to create a hollow elongated member; preferably, the open interior is exposed. Therefore, the fluid medium can pass through the open interior; thereby, reducing the effects of the forces of the fluid medium on the cable 110.

In another embodiment, data lines 487 or other electrical or electronic connections are disposed in and pass through the body of each link 400. These data lines 487 are in communication between the links 400 and each adjacent pair of links. In addition, the data lines 487 extend from the platform, through the cable to the retriever 120. This arrangement provides for system control, power supply and data collection.

The cable 110 includes a plurality of pins 481. Each pin 481 extends between the links 480 in a given adjacent pair of links and is configured to secure together the links in the given pair of links. Each pin 481 has two ends defining a length of the pin. The pins are attached to the adjacent links such that the length 403 of each pin extends parallel to the length of the chain. Preferably, the length of each link 480 runs along the axis 401 of the chain. In general, each pin 481 is cylindrical with a circular cross section and is fabricated from any material (such as titanium) sufficient to hold adjacent links together.

In one embodiment, each link 400 includes at least one and preferably a pair of surfaces 488 formed in the exterior surface of the body and located on opposite ends of each link. In another embodiment, the surfaces of each adjacent pair of links 400 are in contact with each other.

The pin 481 extends through these surfaces. In exemplary embodiments, the pin 481 extends through the midpoint or center of the surfaces of two adjacent links. The pin 481 extends through the surfaces and into the interior of each link 400. In one embodiment, each pin 481 has a spherical head 483 at each ends. As such, the spherical heads 483 are located in the interior of each link 400.

In one embodiment, one spherical head 483 is formed integral into the pin 481 and the other spherical head is removably attached to the pin. For example, the pin 481 is threaded on one end, and the spherical head 483 includes a complementary threaded hole. In another embodiment, the interior of each link includes a concave area 484 disposed on either end opposite the portion of the body containing the surface. Therefore, the pin 481 extends into the concave area 484 with the concave area is shaped to engage the spherical head 483 of the pin 481. This arrangement permits motion of the body of the link 400 with respect to the pin 481.

In one embodiment, adjacent pairs of links 400 include a mechanism between the links to limit rotational motion between the links around the axis of the pin 481. The two surfaces of the links 400 in a given adjacent pair of links include a first surface and a second surface. The first surface has a rod 485 extending from the first surface toward the second surface. This rod 485 engages the second surface. The second surface includes a void 486 extending into the second surface. The rod 485 is engaged in this void 486. In one embodiment, the height of the rod 485 does not exceed the depth of the void 486.

Figure 5:
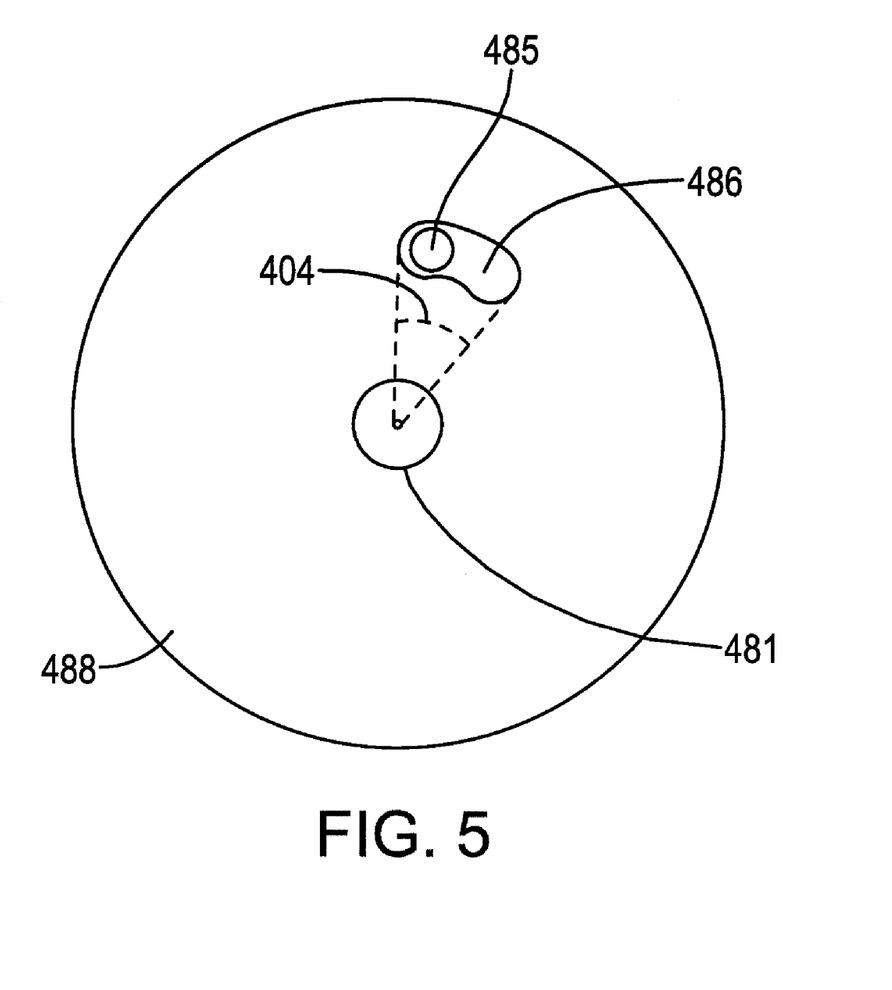
FIG. 5 is a view through section lines 5-5 of FIG. 4.

The rod 485 and void 486 are configured to limit rotation of each link about an axis of the pin running along the length of the pin. Referring to FIG. 5, the void 486 is shaped as and defines an arc, i.e., a portion of a circle, centered on the pin 481 passing through surfaces 488. The rod 485 is engaged in this void 486 and can move in the void along the arc. This void defines an angle of rotation 404 of the surfaces 488 with respect to each other around the axis of the pin 481. This angle of rotation is approximately thirty degrees. Therefore, the rotation of each link about the axis of the pin 481, which runs along the length of the pin, is limited to approximately thirty degrees.

Returning to FIG. 1, based on an initial estimate of the location of the object 199 to be retrieved; the retriever 120 is deployed into the fluid medium by extending the cable 110 from the platform 140. The object 199 can emit a known acoustic frequency. A user of the recovery device 100 monitors signals received by the transducers 121 on the retriever 120 including signals at the known acoustic frequency of the object to be recovered.

In one embodiment, a plurality of transponders 131 that are detachable from the retriever 120 or are otherwise deployable, are deployed in the vicinity of the retriever to provide the user with an acoustic, geographic and navigation reference. In another embodiment, the plurality of transponders 131 is independent of and separate from the retriever 120.

Each transponder 131 is configured to emit a predetermined acoustic frequency. The predetermined acoustic frequency emitted by the transponder 131 can be selected to be detectable by one or more of the transducers 121 and is distinguishable from acoustic signals emitted from the objects to be recovered. The transponders 131 can be stored in a separate transponder stowage 132 on the platform 140 and can be deployed separate from the retriever 120.

A send ping is emitted from each deployed transponder 131 to be incident upon the object 199. The time differentiation between the send ping and receipt of a response or reflection of the send ping for each one of the transponders 131 is measured. These measurements are compared for all deployed transponders 131 and are used to determine the type of object to be recovered and the location of that object 199 relative to the retriever 120.

In one embodiment, the signal emitted from the object 199 is received either by the array of transducers 224 located on the plate at the bottom of the retriever 120 that are arranged to look vertically one of the arrays 222, 223 of transducers around the case 230 of the retriever 120 that are arranged to look horizontally. If the vertically looking array of transducers receives the object signal; then the object 199 is located below the retriever 120; If the object 199 is not located below the retriever 120, one of the horizontal looking arrays of transducers will receive the target signal.

In one embodiment, if the object 199 is not located below the retriever 120, another transponder 130 is deployed at the present location of the retriever and the transponder location is recorded. The retriever 120 is maneuvered in a circle around this location while monitoring for the emitted acoustic frequency of the object 199. The diameter of the circle is increased until the acoustic signal from the object 199 is received at a strength sufficient to calculate a relative bearing from the deployed transponder 130 to the object.

In one embodiment, the platform 140 proceeds from the location of the transponder 130 to pursue an increasingly stronger acoustic frequency signal from the object 199. In the event of a failure or signal interference with the originally deployed transponder 130; additional transponders are launched. Each additional transponder 130 emits a frequency different than that of the other transponders, and a new relative bearing to the object 199 is calculated and pursued. Additional transponders 130 are deployed as needed until the acoustic frequency signal of the object 199 is detected by the array of transducers on the retriever 120 that are arranged to look vertically and a signal-to-noise ratio of the object 199 exceeds that detected by the horizontal array of transducers.

When the signal-to-noise ratio of the object 199 detected by the array of vertically-looking transducers exceeds that detected by the horizontal looking arrays of transducers, the retriever 120 is above the object. Having moved the retriever 120 into a position vertically above the object to be recovered; a plurality of transponders 130 is dropped around the location of the object 199 to establish a perimeter of acoustic navigation references. The retriever 120 is now lowered and maneuvered to the object 199.

The retriever 120 is lowered until it is in contact with the object 199. A user is able to monitor data received by a touch sensor 289 on the bottom of the retriever 120 to indicate when the retriever has contacted the object. Once contact has been made, the fingers 270 of the grabbing mechanism are deployed. The fingers 270 are moved vertically by the vertical motor 272 and horizontally by the horizontal motors 271. The vertical motor 272 rotates the vertical shaft 276 with the result of advancing the central node 275 along that shaft. As the central node 275 moves, the horizontal shafts 274 also move and advance the fingers 270 from the case 230. The horizontal motors 271 are activated to spread the fingers 270 to a sufficient amount to grasp the object 199. Magnets in the fingers 270 can assist in the recovery of the object 199.

When the retriever 120 has secured the object 199; the cable 110 is retracted onto the platform 140. The cable 110 is wrapped around the spool 190. When the retriever 120 is raised to the platform 140; the object 199 is also raised to the platform. Once on the platform 140, the object 199 is accessed from the retriever 120.

In one embodiment, the data lines 487 that extend through the cable 110 are connected to signal processing software that allows the user to track acoustic frequencies from the deployed transponders 131 and to track acoustic signals from the object 199. Additionally, the user monitors tension exerted on the retriever 120 and the cable 110; monitors the weight of the retriever and cable combined; analyzes the signal-to-noise ratio; monitors the proximity of an object to the retriever; and monitors when an object contacts the retriever.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A system for recovery of a physical object, said system comprising:
    a cable having a first and second end;
    a retriever attached to said second end with said retriever including at least two transducers with each transducer configured to detect acoustic frequencies propagating in a fluid medium; and
    a plurality of transponders independent of and spaced apart from said cable and said retriever with each transponder of said plurality of transponders configured to emit a different predetermined acoustic frequency.

2. A device for recovery of a physical object, said device comprising:
    a cable having a first end and a second end; and
    a retriever attached to the second end with said retriever including a section shaped as a cylindrical case with a grabbing mechanism contained within said case and said grabbing mechanism having a plurality of fingers disposed along an interior circumference of said case and movably attached to said grabbing mechanism with each finger of said plurality of fingers having a magnet positioned along a length of each said finger wherein said plurality of fingers are capable of grasping the object and with said retriever including a pressure sensor and a temperature sensor positioned on the interior circumference and longitudinally on said case closer to the attachment of said retriever to the second end of said cable.

3. The device of claim 2, wherein said retriever further comprises at least one touch sensor positioned at the end of each said finger with said touch sensor configured to detect contact between said retriever and the object.

4. The device of claim 3, wherein said retriever further comprises at least two transducers positioned along an interior circumference and longitudinally on said case between said temperature sensor and said grabbing mechanism.

* * * * *